United States Patent [19]

Coulthard

[11] 4,118,903
[45] Oct. 10, 1978

[54] PARTITIONS AND SCREENS

[75] Inventor: James Albert Coulthard, Sheffield, England

[73] Assignee: Baytzner-Coulthard Dokumentations und Werbefilm GmbH, Sheffield, England

[21] Appl. No.: 827,360

[22] Filed: Aug. 24, 1977

[51] Int. Cl.² .................. A47B 5/00; E04B 2/74; E04B 2/82

[52] U.S. Cl. ........................... 52/36; 52/238; 52/239; 52/285; 52/DIG. 13; 108/152; 160/351

[58] Field of Search ............... 52/36, 238, 239, 285, 52/DIG. 13; 160/351; 108/152

[56] References Cited

U.S. PATENT DOCUMENTS

| 1,881,356 | 10/1932 | Gold | 52/285 X |
| 2,205,193 | 6/1940 | Goldman | 108/152 X |
| 3,565,132 | 2/1971 | Cohn, Jr. | 160/351 X |
| 3,871,153 | 3/1975 | Berum, Jr. | 52/239 X |
| 3,889,736 | 6/1975 | Firks | 160/351 X |
| 4,028,855 | 6/1977 | Prewer | 52/DIG. 13 X |
| 4,034,463 | 7/1977 | Ryan | 52/239 X |

FOREIGN PATENT DOCUMENTS

7,300,610  1/1973  Sweden .............. 52/DIG. 13

*Primary Examiner*—Alfred C. Perham
*Attorney, Agent, or Firm*—Lowe, King, Price & Becker

[57] ABSTRACT

An assembly for forming a partition or screen, especially for display purposes, comprises a plurality of panels and connectors, with the edges of the panels carrying a looped attachment material and with the connectors formed of channel-section material with hooked attachment material within their bases, whereby two or more panels can be readily secured together by two or more connectors and as readily disconnected, the looped attachment material preferably also extending over both faces of the panels so that articles to be displayed and carrying hooked attachment material can be detachably secured to the panels, and likewise shelves with brackets with abutments to embrace the edges of panels can be secured in place by hooked attachment material on the abutments.

22 Claims, 15 Drawing Figures

U.S. Patent  Oct. 10, 1978  Sheet 1 of 3  4,118,903
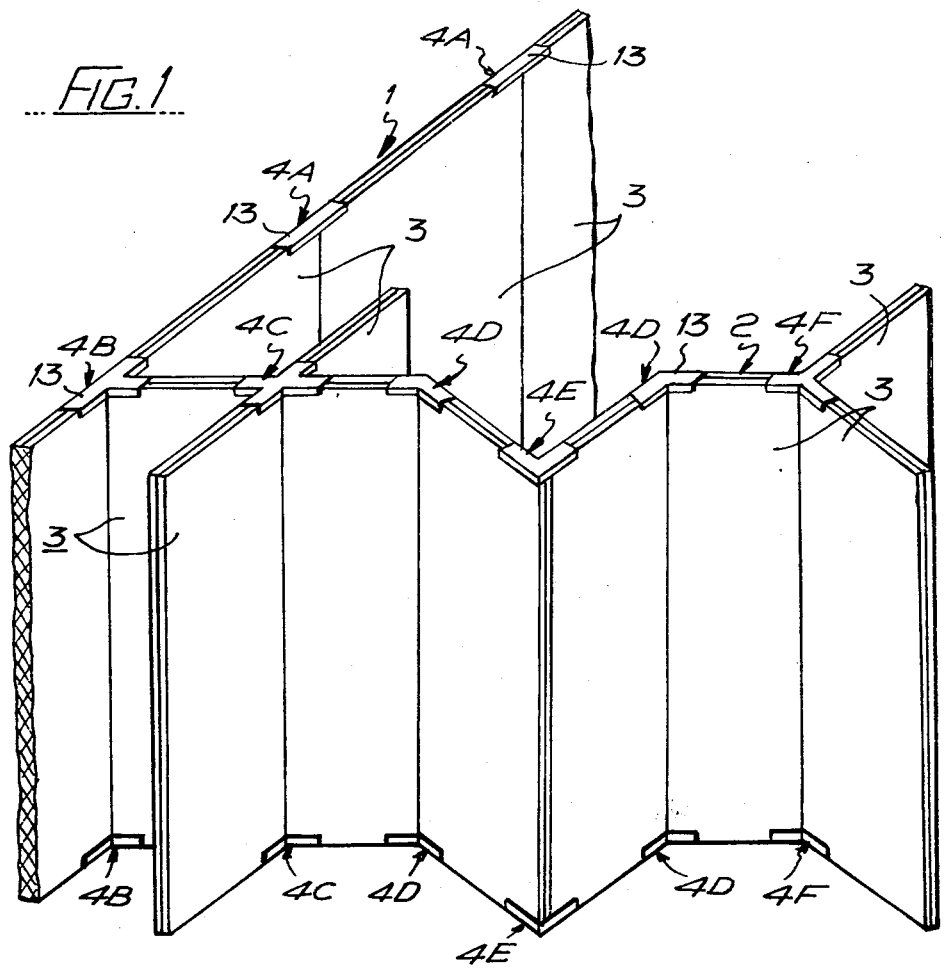
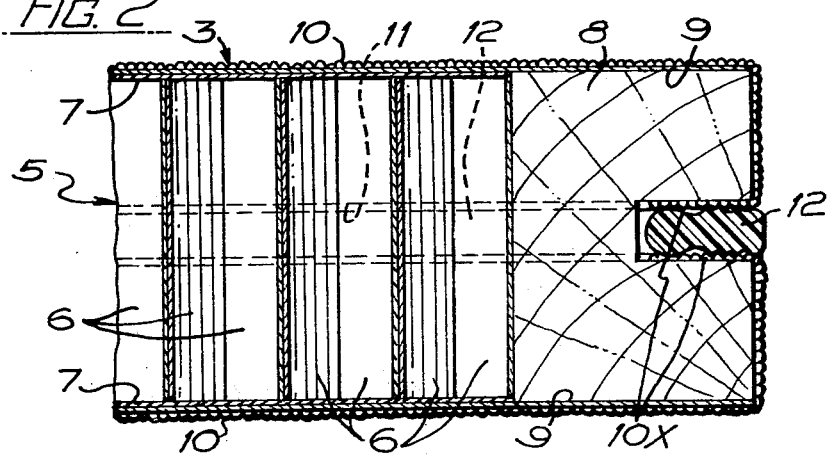

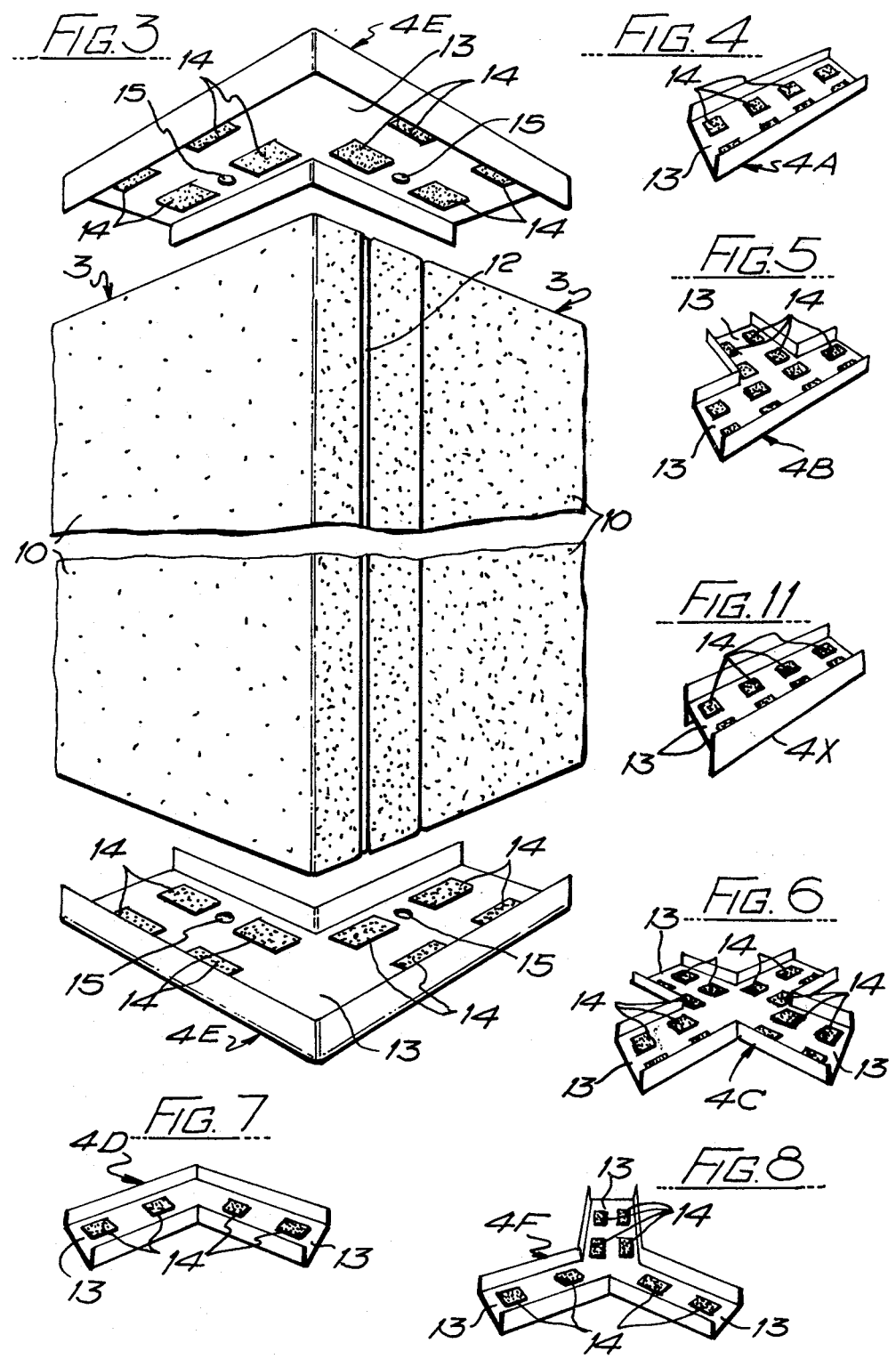

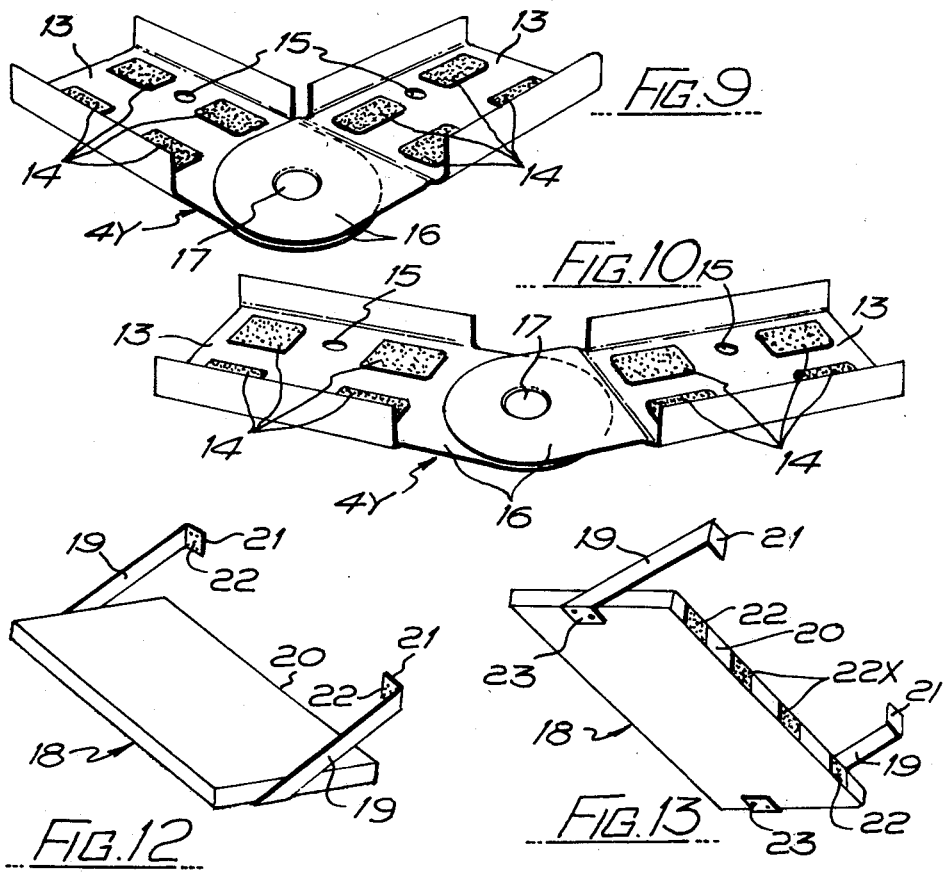
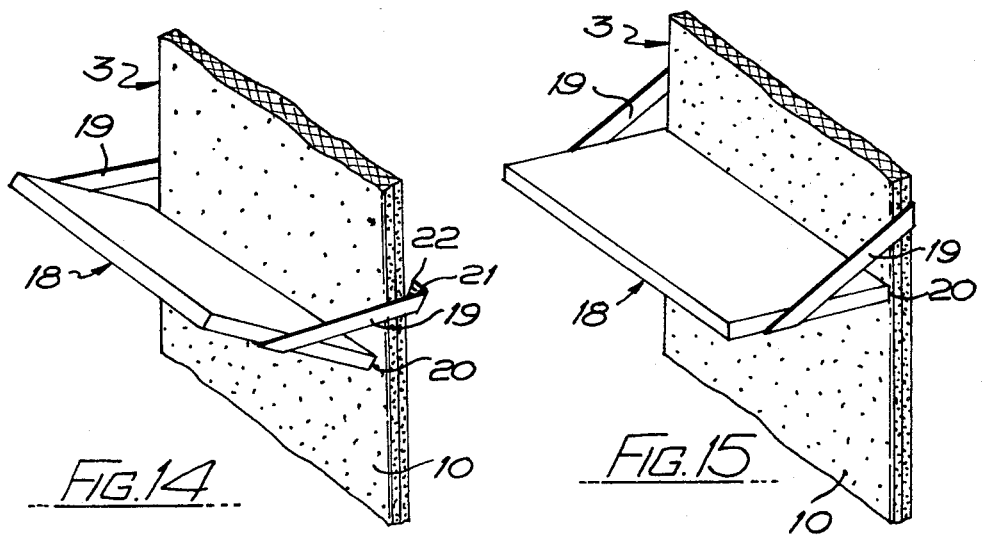

PARTITIONS AND SCREENS

This invention relates to partitions and screens for dividing up room areas and/or for display purposes, and has for its object the provision of an assembly of panels and connectors which is readily erected to form a partition or screen and readily dismantled.

According to the present invention, an assembly for forming a partition or screen comprises a plurality of panels edged with an attachment material having a multiplicity of loops, and a plurality of connectors comprising channel-section members within the bases of which is provided attachment material having a multiplicity of hooks for engagement with the loops of the attachment material on the edges of the panels, whereby two or more panels can be readily secured together by two or more connectors and as readily disconnected.

The bases of the connectors may be provided with holes for screws for screwing into the edges of the panels (which may have wooden frames), to keep the panels permanently in register, i.e., to prevent them pulling apart, the attachment materials being adequate to prevent slipping between adjacent panels.

The connectors may comprise straight lengths of channel-section, channel-section back-to-back (i.e., H-section), cruciform, angle (e.g., 90° and 135°), T-shaped and Y-shaped, or adjustable, so as to permit a wide variety of shapes of free-standing partitions and screens (especially display screens) to be constructed, but the assembly may also include brackets with holes for screws for screwing to existing walls, floors or ceilings and with attachment material with hooks for engagement with the loops of the attachment material on the edges of the panels.

The connectors may be formed of pressed steel or other metal, or they may be moulded in plastics, with the attachment material secured by adhesive.

The attachment material with the loops on the edges of the panels may also extend over one or both faces of the panels, so that the panels can be used for displaying articles which are provided with portions of attachment material having a multiplicity of hooks. Thus each panel may be covered with two sheets of attachment material with loops, one extending over each face and wrapping round the edges, to which the margins of the sheets are secured, as by staples, or by extending into grooves along the edges into which are pressed locking strips or a locking wire. Such grooves along the edges may also serve to receive keying plates or strips for location of adjacent panels in accurate alignment, and the keying plates or strips may be secured to the panels by screws through the margins of the panels and across the grooves.

The panels are preferably formed of cellular or honeycomb material affording lightness with strength, preferably within a wooden frame, and with any facing material or sheet, e.g., paper, cardboard, plastics, laminate, or stainless steel (as well as the attachment material with loops at least) along the edges, as aforesaid, secured thereto by suitable adhesive.

In general, the assembly comprises rectangular or square panels, but any other polygonal form, whether regular or irregular, may be included to enable particular and/or intricate displays to be constructed.

According to another aspect of the present invention, a shelf may be supported by one of the panels with attachment material with loops extending over both faces, the shelf being provided at each end with a bracket extending beyond the edge of the shelf nearest the panel with two lateral abutments, one adjacent the shelf and the other at a higher level and spaced from it by not less than the thickness of the panel, the extension and the abutments at each end of the shelf being adapted to embrace an edge portion of the panel, with attachment material having a multiplicity of hooks on the mutually-facing surfaces of the abutments for engagement with the looped attachment material on the panel.

The difference in level between the abutments enables the brackets to be tilted by lifting the shelf to take the looped and hooked attachment materials out of engagement with each other and so allow the shelf to be moved up or down the panel to any desired position, when lowering of the shelf brings the looped and hooked attachment materials into engagement with each other again to hold the shelf in its adjusted position, any load on the shelf—including its own weight—causing pressure to be applied to the engaged attachment materials, thus increasing the engagement of these materials and, therefore, making the shelf more secure.

The edge of the shelf nearest the panel preferably constitutes an abutment at or towards each end, and that edge of the shelf is preferably also provided with intermediate portions of hooked attachment material for engagement with looped attachment material all over at least the adjacent face of the panel.

The brackets may be detachably secured to the shelf so that the brackets can be initially fitted to any panel, whereafter, when the brackets have been secured to the shelf, the shelf cannot be removed unless the brackets can be moved to and past the upper or lower edges of the panel, but the brackets may be flexible, so as to enable them to be sprung a little to enable the shelf to be fitted to or removed from any panel.

The brackets may be formed by bending suitably shaped blanks of sheet metal, or they may be formed of rigid plastics material, and may be attached by screws to the shelves, which may be formed by metal, wood, plastics material, or any laminated material, including any construction similar to the panels. Alternatively, the brackets may be formed integrally at the ends of a shelf formed of sheet metal or rigid plastics material.

The hooked attachment material may be secured to the abutments by adhesive.

Various features of the invention will now be described, by way of example only, with reference to the accompanying drawings, in which:

FIG. 1 is a diagrammatic general view of a partition and display screen formed by an assembly in accordance with the invention;

FIG. 2 is a fragmentary enlarged section through an edge portion of one of the panels of the assembly of FIG. 1;

FIG. 3 is a fragmentary perspective view showing a pair of connectors used in forming the display screen of FIG. 1 about to be applied to a pair of panels;

FIGS. 4 to 8 are perspective views showing the detail of other connectors used in forming the partition and display screen of FIG. 1;

FIGS. 9 and 10 are perspective views of an adjustable connector in two different positions of adjustment;

FIG. 11 is a perspective view of yet another form of connector;

FIGS. 12 and 13 are perspective views of a shelf for use with a panel in the partition or display screen of FIG. 1, taken from above the front edge and below the rear edge, respectively; and FIGS. 14 and 15 are perspective views showing the shelf of FIGS. 12 and 13 being adjusted in relation to and supported by a panel.

In FIG. 1 a partition 1 and a display screen 2 are formed by an assembly comprising a plurality of panels 3 and a plurality of connectors 4 which are identified as to types by suffixes A to F. As shown in FIG. 2, each panel 3 comprises cellular material 5 formed from corrugated cardboard 6 faced with cardboard sheets 7 within a wooden frame 8 with mitred glued joints at the corners, an overlay of cardboard 9 over each sheet 7 and the adjoining surfaces of the wooden frame, and an attachment material 10 having a multiplicity of loops over both faces of the panel, with margins 10X of the sheets of attachment material extending into grooves 11 along the edges of the frame 8 and into which is pressed a locking strip 12 of plastics material. As shown in FIGS. 3 to 11, each connector 4 comprises one or more channel-section members within the bases 13 of which is provided attachment material 14 having a multiplicity of hooks for engagement with the loops of the attachment material 10 on the edges of the panels 3, whereby two or more panels are readily secured together by two or more connectors and as readily disconnected.

The bases 13 of the connectors 4 may be provided with holes 15 (FIG. 3) for screws (not shown) for screwing into the edges of the panel, to keep the panels permanently in register.

The connectors 4A (see FIGS. 1 and 4) comprise straight lengths of channel-section for securing panels 3 together in the same plane. FIG. 11 shows an alternative 4X for the same purpose consisting of channel-sections back-to-back (i.e., H-section), but this is preferably employed only for securing one panel above another.

The connectors 4B (FIGS. 1 and 5) each comprise one channel-section perpendicular to another and intermediate the ends thereof (i.e., T-shaped), which enables one panel to be secured perpendicular to another panel or perpendicular to a pair of panels secured together in the same plane.

The connectors 4C (FIGS. 1 and 6) each comprise two channel-sections perpendicular to another and intermediate the ends thereof (i.e., cruciform), which enables two panels to be secured perpendicular to another panel or perpendicular to a pair of panels secured together in the same plane.

The connectors 4D (FIGS. 1 and 7) each comprise two channel-sections at an angle to each other (e.g., 135°), which enables two panels to be secured together in different planes, while the connectors 4E (FIGS. 1 and 3) each comprise two channel-sections at right angles to each other, which enables two panels to be secured perpendicular to each other at a corner or to form a recess.

The connectors 4F (FIGS. 1 and 8) each comprise three channel-sections in a Y-shape, which enables three panels to be secured together in different planes.

In FIGS. 9 and 10 a connector 4Y comprises two channel-sections with extensions 16 of their bases 13 overlapping and connected by a pivot 17, which enables two panels to be secured together and the angle between them adjusted. Alternatively, a panel serving as a door may be pivoted by two connectors 4Y to one of a pair of panels spaced apart to form a doorway.

The panels 3 can be used for displaying articles (not shown) which are provided with portions of attachment material having a multiplicity of hooks for engagement with the looped attachment material 10, thus giving considerable flexibility to the manner of displaying any particular article or series of articles, without risk of damage to the panels and/or the articles, beyond having to secure the hooked attachment material to the article by adhesive, e.g., self-adhesive, and possibly later having to remove it from the article.

In FIGS. 12 to 15 a shelf 18 is provided at each end with a bracket 19 extending beyond the edge 20 of the shelf adapted to be nearest a panel 3, the edge 20 of the shelf constituting an abutment towards each end and each bracket being provided with an abutment 21 at a higher level than the shelf abutment and spaced from it by not less than the thickness of the panel, and the extending portion of the brackets and the abutments at each end of the shelf being adapted to embrace an edge portion of the panel, with attachment material 22 having a multiplicity of hooks on the mutually-facing surfaces of the abutments for engagement with the looped attachment material 10 on the panel, and the edge 20 of the shelf is also provided with intermediate portions 22X of hooked attachment material for engagement with the looped attachment material which extends all over the adjacent face of the panel.

The brackets 19 are formed by bending suitably shaped blanks of sheet metal, or moulded from rigid plastics material, with flanges at one end forming the abutments 21 and flanges 23 at the other end provided with holes to enable the brackets to be screwed to the shelf 18, the brackets preferably having enough flexibility to enable them to be sprung a little to enable the shelf to be fitted to or removed from the panel 3 when not abutted on either edge by another panel. Alternatively, the brackets 19 can be slipped on to the panel 3 from the upper or lower edges (not shown) of the panel.

The difference in level between the abutments 20, 21 enables the brackets 19 to be tilted by lifting the shelf 18 to take the looped and hooked attachment materials 10, 22, 22X out of engagement with each other (see FIG. 14) and so allow the shelf to be moved up or down the panel 3 to any desired position, when lowering of the shelf brings the looped and hooked materials into engagement with each other again to hold the shelf in its adjusted position (see FIG. 15). Any load on the shelf 18, including its own weight, causes pressure to be applied to the engaged attachment materials 10, 22, 22X, thus increasing the engagement of these materials and, therefore, making the shelf more secure.

What I claim is:

1. An assembly for forming a partition or screen comprising a plurality of panels edged with an attachment material having a multiplicity of loops, and a plurality of connectors comprising channel-section members within the bases of which is provided attachment material having a multiplicity of hooks for engagement with the loops of the attachment material on the edges of the panels, whereby two or more panels can be readily secured together by two or more connectors and as readily disconnected.

2. An assembly as in claim 1, wherein the bases of the connectors are provided with holes for screws for screwing into the edges of the panels or to existing walls, floors or ceilings.

3. An assembly as in claim 1, wherein the connectors comprise straight lengths of channel-section.

4. An assembly as in claim 3, wherein the connectors comprise straight lengths of channel-section back-to-back.

5. An assembly as in claim 1, wherein the connectors comprise straight lengths of channel-section in cruciform.

6. An assembly as in claim 1, wherein the connectors comprise straight lengths of channel-section at an angle.

7. An assembly as in claim 1, wherein the connectors comprise straight lengths of channel-section in T-shaped and Y-shaped array.

8. An assembly as in claim 1, wherein the connectors comprise straight lengths of channel-section adjustable as to angle.

9. An assembly as in claim 1, wherein the connectors are formed of pressed steel or other metal with the attachment material secured by adhesive.

10. An assembly as in claim 1, wherein the connectors are moulded in plastics with the attachment material secured by adhesive.

11. An assembly as in claim 1, wherein the attachment material with the loops on the edges of the panels also extends over at least one face of each panel, so that the panels can be used for displaying articles which are provided with portions of attachment material having a multiplicity of hooks.

12. An assembly as in claim 11, wherein each panel is covered with two sheets of attachment material with loops, one extending over each face and wrapping round the edges, to which the margins of the sheets are secured by extending into grooves along the edges into which are pressed locking strips.

13. An assembly as in claim 1, wherein the panels are formed of cellular material affording lightness with strength.

14. An assembly as in claim 13, wherein the cellular material is within a wooden frame.

15. An assembly as in claim 13 wherein facing material for the cellular material is secured thereto by suitable adhesive.

16. An assembly as in claim 12, wherein a shelf is supported by one of the panels with attachment material with loops extending over both faces, the shelf being provided at each end with a bracket extending beyond the edge of the shelf nearest the panel with two lateral abutments, one adjacent the shelf and the other at a higher level and spaced from it by not less than the thickness of the panel, the extension and the abutments at each end of the shelf being adapted to embrace an edge portion of the panel, with attachment material having a multiplicity of hooks on the mutually-facing surfaces of the abutments for engagement with the looped attachment material on the panel.

17. An assembly as in claim 16, wherein the edge of the shelf nearest the panel constitutes an abutment adjacent each end.

18. An assembly as in claim 17, wherein that edge of the shelf is also provided with intermediate portions of hooked attachment material.

19. An assembly as in claim 16, wherein the brackets are flexible.

20. An assembly as in claim 19, wherein the brackets are formed by bending suitably shaped blanks of sheet metal.

21. An assembly as in claim 19, wherein the brackets are formed of rigid plastics material.

22. An assembly as in claim 16, wherein the hooked attachment material is secured to the abutments by adhesive.

* * * * *